United States Patent [19]

Sakhuja et al.

[11] 4,374,660
[45] Feb. 22, 1983

[54] FLUIDIZED BED GLASS BATCH PREHEATER

[75] Inventors: Ravinder K. Sakhuja, Lexington; William E. Cole, Sudbury; Dimitris Pavlakis, Cambridge, all of Mass.

[73] Assignee: Thermo Electron Corporation, Waltham, Mass.

[21] Appl. No.: 293,913

[22] Filed: Aug. 18, 1981

[51] Int. Cl.³ .............................................. C03D 3/00
[52] U.S. Cl. ......................................... 65/335; 65/27; 65/135
[58] Field of Search ................... 65/27, 134, 135, 136, 65/335

[56] References Cited

U.S. PATENT DOCUMENTS

| | | | |
|---|---|---|---|
| 2,114,545 | 4/1938 | Slayter | 49/77 |
| 2,284,398 | 5/1942 | Kutchka | 49/54 |
| 3,185,554 | 5/1965 | Sweo et al. | 65/17 |
| 3,728,094 | 4/1973 | Bowman | 5/16 |
| 3,924,030 | 12/1975 | Tatara et al. | 472/213 |
| 3,938,976 | 2/1976 | Walker | 65/29 |
| 4,099,953 | 7/1978 | Rondeaux et al. | 65/335 |
| 4,135,904 | 1/1979 | Suzuki et al. | 65/27 |
| 4,225,332 | 9/1980 | Tsay | 65/134 |
| 4,292,064 | 9/1981 | Propster | 65/27 |

Primary Examiner—Robert L. Lindsay, Jr.
Attorney, Agent, or Firm—Herbert E. Messenger; James L. Neal

[57] ABSTRACT

A glass batch preheater in one stage of which hot flue gases from a glass melting furnace are passed through a bed of cullet and a bed of glass batch material. The bed of cullet, while being heated, filters dust and other particles from the hot flue gases while the bed of glass batch materials is simultaneously heated and fluidized. An alternative preheater includes a first stage and a second supplementary stage to further heat the glass batch material. A separate stage may also be used for elutriation of glass particles. Steam may be injected to provide moisture to the glass batch and for other purposes.

7 Claims, 4 Drawing Figures

FLUIDIZED BED GLASS BATCH PREHEATER

BACKGROUND OF THE INVENTION

The glass industry is a major user of natural gas. Natural gas accounts for 70 percent of the industry's $300 \times 10^{12}$ Btu annual energy consumption. Almost 50 percent of this energy, or approximately $150 \times 10^{12}$ Btu/yr., is natural gas consumed in melting furnaces. A glass melting furnace typically consists of a melter and a refiner. The raw materials, referred to as batch, are fed into the melter by the batch feeders. The batch consists primarily of sand, limestone, and soda ash. The melter is a refractory-lined pool of unmelted batch and molten glass. Several burners firing over the pool heat and melt the materials. The molten glass then flows through the throat to the refiner to allow trapped bubbles to rise, thus ensuring a defect-free product.

The melter operates at temperatures near 2800° F. At this high temperature, heat losses are large and material properties limit the amount of insulation that can be used. Additionally, the sensible heat in the flue gases is large. To recover this heat, regenerators are used in most glass furnaces to preheat the combustion air. These regenerators consist of a latticework of brick called checkers. The flue gases are passed through one checker which they heat. When this checker is sufficiently hot, the valve is switched, diverting the flue gases to the second checker and drawing the combustion air through the first checker. The first checker then serves to preheat the combustion air. This cycle is repeated about every 20 minutes with flue gas temperatures for each checker varying with time. Checker exhaust temperatures vary from 600° to 1200° F.

For a typical regenerative furnace energy inputs vary from about $4 \times 10^6$ to $7 \times 10^6$ Btu per ton of glass. For a 200 ton-per-day unit, a typical energy requirement would be about $6 \times 10^6$ Btu per ton. Only about 20 to 30 percent of the input is required to provide for the thermochemical reactions involved and for heating the glass. The balance of the heat input is lost in the flue gases and through furnace surfaces as convection and radiation losses.

One area for improvement of glass melting furnace energy utilization is greater recovery of heat from flue gases. Currently, essentially all glass furnaces use regenerators to recover heat from the flue gases to preheat combustion air. However, exhaust temperatures from the regenerator are still sufficiently high to provide not only preheating of glass batch materials but to perform additional heating functions as well.

Attempts to preheat batch agglomerated in the form of pellets or briquettes have been made. However, the agglomeration process results in high capital or operation and maintenance costs. Because of these disadvantages, fluidized beds have been considered for batch preheaters. With a fluidized bed preheater, hot flue gases from a regenerator associated with the melting furnace are ducted to rise vertically through the loose glass batch. The gas velocity is chosen such that the drag on each particle is equal to its weight, and hence each particle is suspended in the gas flow. Fluidized beds have other properties which recommend them for preheating, including high heat transfer rates, ease of materials handling, and high effective thermal conductivity.

In addition to the need for reducing energy use, increasingly strict environmental controls require not only the reduction of air pollution by exhaust gases, but also the elimination of particulate pollution. The fluidized bed will act as a filter and help to achieve this objective.

The provision of steam injection in a system for preheating glass batch materials would also be helpful not only as a processing aid but also to reduce pollution. Steam could also be generated within the system for this process and other purposes such as room heating.

Accordingly, it is a primary object of the present invention to conserve energy in the making of glass.

Another object of the present invention is to reduce particulate and gaseous pollution in the operation of glass furnaces.

A further object is a more efficient glass batch preheater providing an output at high temperature.

A still further object is a glass batch preheating system having a low initial cost and low operating and maintenance costs.

SUMMARY OF THE INVENTION

In the present invention, hot exhaust gases from the regenerator of a glass melting furnace are utilized in a glass batch preheater to fluidize and heat the batch. In one system of the invention, the hot gases are ducted first to a plenum chamber at the base of the preheater and are passed first through a bed of cullet and then through a bed of glass batch through which they rise, giving up heat to the bed as they fluidize it. As the hot gases pass through the cullet bed, dust and other particulate matter is filtered from the gases by the cullet as the cullet also is preheated.

In another system in which a bed of cullet may or may not be used, a fraction of the batch particles may become entrained by gases passing through the bed and then may be removed by a cyclone particle remover. Alternatively, a separate stage is used to elutriate a controlled fraction of the batch. The fine particles are reinjected into the mainstream at a point prior to that at which the preheating has been completed. Still other preheating systems involve a separate stage used to further increase the temperature of the batch. In yet another embodiment, moisture for hydration and suppression of particulate entrainment may be provided by the injection of steam into the fluidized bed, the steam being generated in a boiler heated by hot flue gases from the glass furnace regenerator.

For a better understanding of the present invention, together with other and further objects, features, and advantages, reference should be made to the appended drawings in which.

DESCRIPTION OF PREFERRED EMBODIMENT

Figure 1:
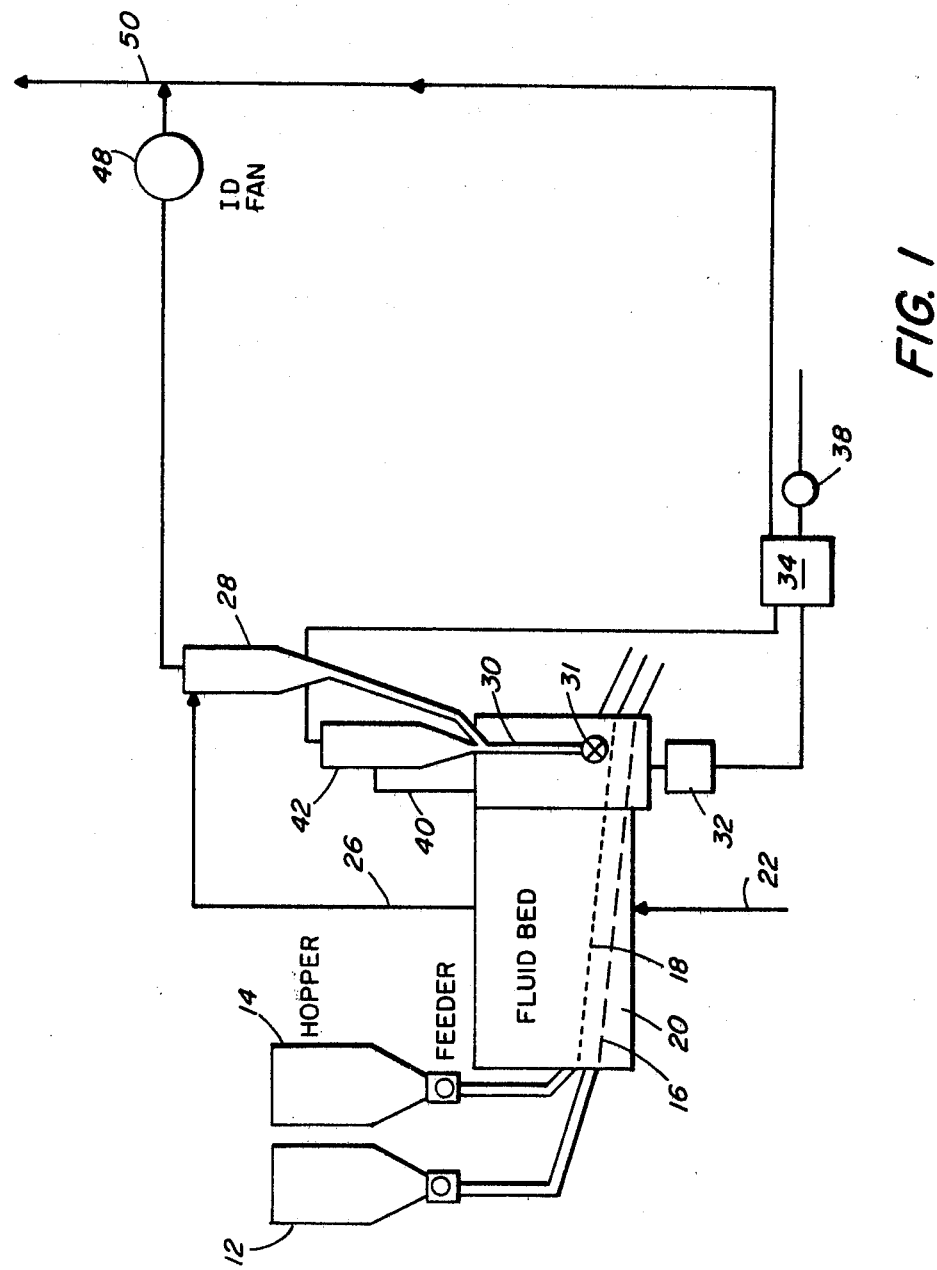
FIG. 1 is a schematic sectional view of a glass batch preheater incorporating principles of the present invention.

One form of glass batch preheating system built in accordance with the present invention is shown in FIG. 1. In this case, the system includes a feed hopper 12 into which cullet is fed. Immediately adjacent the feed hopper 12 is a second feed hopper 14 into which glass batch material is fed.

The cullet, which is composed of relatively large glass fragments, flows across and forms a shallow bed on a rough grate 16 which runs the length of the main body of the preheater and which may be inclined with respect to that body. In similar fashion, the glass batch material, which is composed of relatively fine generally granular materials, flows across and forms a shallow bed on a fine grate 18 which is spaced from and parallel to the rough grate 16.

Beneath the rough grate 16, a plenum chamber 20 is formed in the body of the preheater. A duct 22 connected to the plenum chamber delivers hot flue gases from the glass furnace associated with the preheater.

From the plenum chamber 20, the hot gases rise through the cullet bed where dust and other particles entrained in the hot flue gases are trapped and the cullet is heated. As the hot gases rise further and pass through the glass batch materials, the glass batch is simultaneously fluidized and heated.

The flue gases after passing through the bed of glass batch are exhausted through a duct 26 to a cyclone separator 28. Fine particles entrained in the exhaust gases are removed by the cyclone and directed through a pipe 30 to mix with preheated batch, preferably within the fluidized bed or alternatively beyond the exit of the bed. A conventional trickle-down flapper valve 31 opens periodically as the weight of the column of particles exceeds the pressure normally holding the valve in a closed position. The exhaust gases from the cyclone separator 28 may be further treated or merely power-exhausted by a fan 48 through an exhaust stack 50.

With the available flue gases, it is possible to heat the bed of cullet and the fluidized bed of glass batch to only about 1000° F. To obtain higher temperatures in the cullet and in the batch, a separately fired second stage may be added to the system to raise the preheat temperature to approximately 1450°–1500° F. It should be noted that the second stage may be used in conjunction with a first stage in which both cullet and batch are preheated or may be used where only batch is preheated in the first stage.

Heating for the second stage is provided by a gas burner 32. Combustion air for the gas burner 32 is derived from an air preheater 34. Necessary pressure for driving the output gases and combustion products of the burner 32 through the cullet bed, if used, and the fluidized glass batch bed is provided by a blower 38. Exhaust gases from the secondary heating stage are passed through a duct 40 to a second cyclone separator 42. The exhaust gases from the second cyclone 42 are ducted to the combustion air preheater 34 and they are also exhausted through the exhaust stack 50.

Particles separated from the exhaust gases of the second stage by the cyclone 42 are, like those from the cyclone 28, directed back to the mainstream by the nozzle 30 through the trickle-down valve 31.

Figure 2:
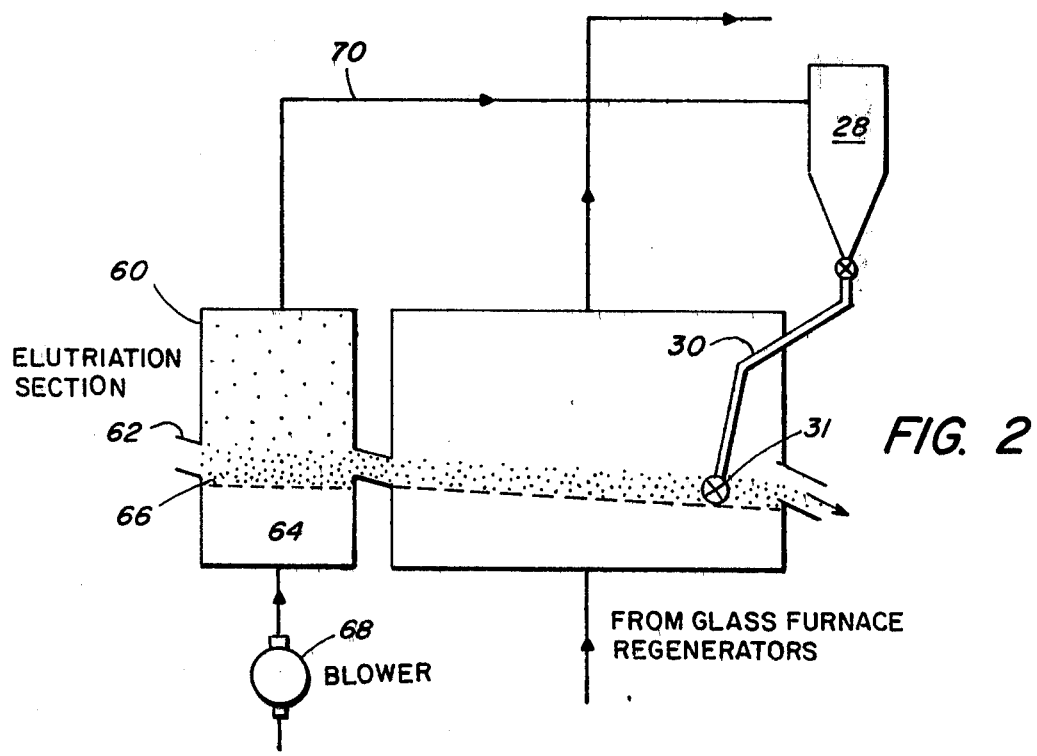
FIG. 2 is a schematic sectional view of an elutriation stage.

In FIG. 2, one possible approach to elutriation of the fine particles is shown. A separate elutriation stage 60 is illustrated having an inlet opening 62 for the introduction of glass batch material. A plenum chamber 64 is formed in the bottom of the elutriation section, and a grate 66 comparable to the grate 18 is disposed above the plenum chamber. A blower provides input air to fluidize the glass batch material which traverses the grate 66. The pressure of the air from the blower 68 in addition to fluidizing the bed of batch materials forces a controlled fraction of the batch through a duct 70 to the cyclone 28, from which the particles that have been separated from the airstream are returned through a line 30 and a trickle-down valve 31 to the preheater.

Figure 3:
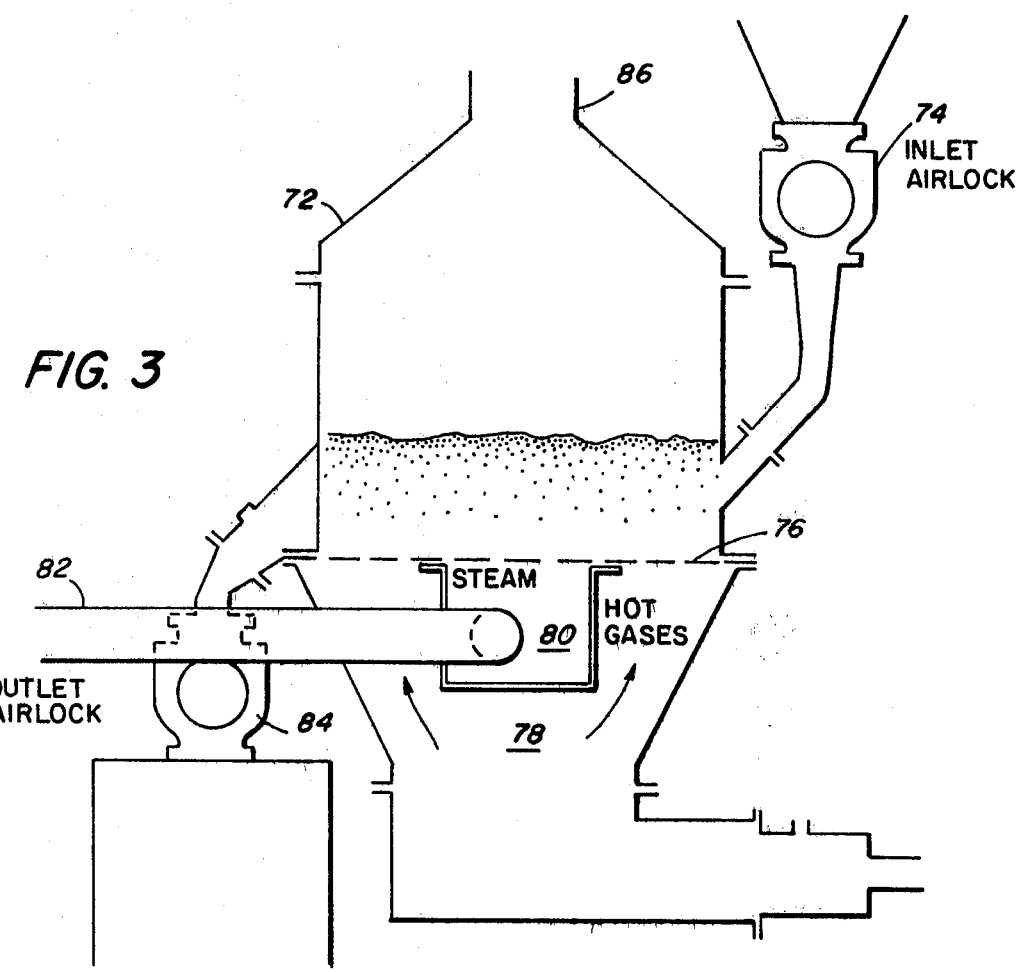
FIG. 3 is a preheater stage having steam injection.

In FIG. 3, there is shown a system for adding moisture to the glass batch to aid in the hydration process and to suppress particulate entrainment in the exhaust gases. The system may be used as an alternative or as a supplement to known systems which typically involve spray nozzles disposed above the glass batch in spaced array to provide a uniform distribution of water, NaOH, $Na_2CO_3$, $Na_2SO_4$, or combinations of those materials.

A separate stage 72 which follows the initial preheating stage is preferred. The initial preheating stage may be for batch material only or for batch and cullet. Batch material is introduced through an inlet airlock 74 or by a screw-feeder, a standpipe, or other means, and is fluidized upon the grate 76. The fluidizing medium in this case is a combination of hot flue gases from the glass melting furnace recuperator which are delivered to the plenum chamber 78 and a centrally located steam compartment 80 beneath the grate 76. The steam may be generated in a boiler (not shown in FIG. 3) which also derives its heat from the hot flue gases from the melting furnace and is delivered to the steam compartment 80 through a duct 82. The moistened glass batch is passed to the next stage through an outlet airlock 84 or, alternatively, a trickle-down valve. Exhaust gases may be passed out through a stack 86 or may be processed further before being exhausted to the atmosphere.

Figure 4:
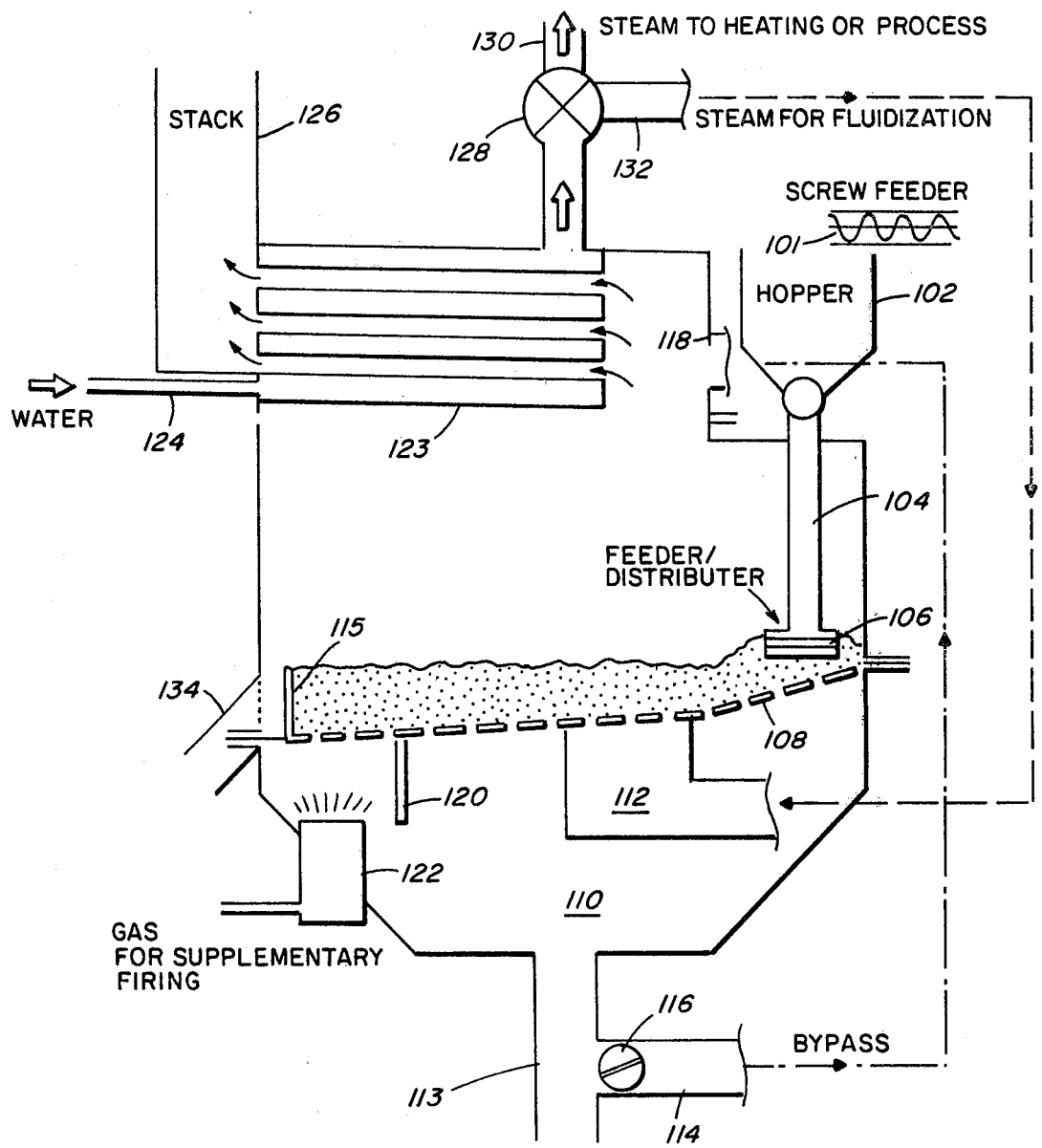
FIG. 4 is an embodiment of the invention wherein steam is employed for various purposes.

FIG. 4 illustrates one system in which steam may be employed for various additional purposes when it is used in connection with batch preheating. The batch in a wet state may be introduced by a screw feeder 101 to a hopper 102. Wetting of the batch minimizes problems of segregation and dusting during handling. From the hopper 102, the batch is fed through a duct 104 to a rotary feeder/distributor 106. The feeder/distributor spreads the batch evenly upon an inclined grate 108 which extends across a plenum chamber 110. A steam compartment 112 having an open top is also disposed beneath the grate 108 within the plenum chamber 110. Hot flue gases from the glass melting furnace are fed to the plenum chamber 110 through a duct 113. A bypass duct 114 having an adjustable valve 116 permits control of the quantity of hot flue gases which are fed to the plenum chamber 110. The bypass duct 114 may be connected to the preheating stage at a point above the bed such as that shown at 118.

A partition 120 extends downwardly from the grate 108, dividing the plenum chamber into two sections. In the event that additional heat is required to aid prereactions, a supplementary gas burner 122 is operable to provide heat to the portion of the fluidized bed in the shorter section. A weir 115 extends upwardly from the grate 108 adjacent the outlet end to control the height of the fluidized bed. Material overflowing the weir 115 passes into a standpipe 134 which may be equipped with a restriction, a trickle-valve arrangement, or an airlock to prevent back pressure effects on the fluidized bed.

A steam boiler 123 is disposed at the top of the preheating stage. Water is supplied to the boiler tubes through an inlet 124. Exhaust gases from the fluidized bed pass over the boiler tubes and thence to an exhaust stack 126. Alternatively, the boiler tubes may be heated in or immediately above the fluidized bed. Steam derived from the heating of the water in the boiler tubes is piped to a distribution valve 128. From the valve 128, steam may be tapped off through a pipe 130 for heating or other purposes. Steam for the fluidization of the glass batch bed is tapped off through a pipe 132 which is connected to the steam compartment 112. The amount of moisture added to the batch by the steam may be controlled by the valve 116 which determines the amount of hot flue gases which will pass over the boiler tubes to generate steam.

In a typical 200 ton-per-day preheater with exhaust gas temperatures in the first stage of 1000° F., an approximate 25% reduction in energy consumption can be achieved. Moreover, the $NO_x$ emissions will be reduced by a similar amount because of the reduced firing rate in the furnace. With supplemental gas firing as described in connection with FIG. 1, a still further improvement in overall process efficiency results because heat is transferred to the batch at a temperature of 1500° F., which is relatively low compared to the 2800° F. temperature of the glass melter. Furthermore, the design and configuration of the batch preheater permits more efficient heat transfer than that of the main glass tank of the melting furnace. Finally, the preheating of the batch permits operation of the melting furnace at a lower temperature, which not only extends the life of the furnace but results in greater conservation of energy.

What is claimed is:

1. A glass batch preheater for operation in conjunction with a glass melting furnace having a regenerator comprising:
   an elutriation stage;
   a first relatively fine, inclined grate disposed within and running the length of said elutriation stage;
   means for supplying glass batch material to said elutriation stage near the high end of the first grate to form a shallow bed upon said grate;
   blower means connected to said elutriation stage beneath said grate for providing an upward flow of gas to fluidize said shallow bed;
   an exhaust duct connected to said elutriation stage above said shallow bed for carrying exhaust gases and entrained particles therefrom;
   a preheater stage;
   a second relatively fine inclined grate disposed within and running the length of said preheater stage;
   means for removing glass batch material from an outlet end of said elutriation stage and supplying said material to said preheater stage near the high end of the second grate to form a shallow bed upon said second grate;
   means for directing exhaust gases from said regenerator upwardly through said bed in the preheater stage to heat and fluidize said glass batch materials therein;
   a cyclone connected to said exhaust duct for separating said entrained particles from the exhaust gases of said elutriation stage; and
   means for re-injecting said separated particles into the glass batch material in said preheater stage.

2. A glass batch preheater for operation in conjunction with a glass melting furnace having a regenerator comprising:
   a preheater stage;
   a relatively fine, inclined grate disposed within and running the length of said preheater stage;
   means for supplying glass batch material to said preheater stage near the high end of said inclined grate to form a shallow bed upon said grate;
   a steam boiler disposed within the preheater stage and including tubes exposed to hot gases within said preheater stage;
   a plenum chamber disposed beneath said grate;
   an open-topped steam compartment disposed within said plenum chamber beneath said grate and operable to direct steam upwardly though said bed of glass batch material;
   means for piping steam from said boiler to said steam compartment;
   means for directing exhaust gases from said regenerator to said plenum chamber and thereafter upwardly through said bed of glass batch material to fluidize and heat said glass batch material; and
   outlet means for removing glass batch material from said preheater stage.

3. A glass batch preheater for operation in conjunction with a glass melting furnace having a regenerator comprising:
   a preheater stage;
   a relatively fine, inclined grate disposed within, and running the length of, said preheater stage;
   means for supplying glass batch material to said preheater stage near the high end of said grate to form a shallow bed upon said relatively fine grate;
   a relatively coarse, inclined grate disposed beneath and spaced from said first grate;
   means for supplying exhaust gases from said regenerator upwardly through said bed of cullet upon said relatively coarse grate;
   means for supplying cullet to said preheater stage near the high end of said relatively coarse grate to form a shallow bed of cullet upon said relatively coarse grate;
   outlet means for removing glass batch material and cullet from said preheater stage; and
   means for directing exhaust gases from said regenerator upwardly through said bed of cullet to heat said bed of cullet and trap particles entrained in said exhaust gases and upwardly through said bed of glass batch material to fluidize and heat said glass batch material.

4. A glass batch preheater as defined in claim 3 further including:
   a supplemental stage having an inlet adjacent to the outlet of said preheater stage for receiving glass batch material and cullet from said preheater stage and an outlet for removal of glass batch material and cullet from said supplemental stage;
   a burner;
   means for driving exhaust gases from said burner upwardly through the cullet and glass batch material in said supplemental stage to heat said cullet and to fluidize and heat said glass batch material; and
   combustion preheater means for preheating combustion air for said burner using exhaust gases from said supplemental stage.

5. A glass batch preheater for operation in conjunction with a glass melting furnace having a regenerator comprising:
   a preheater stage;
   a relatively fine, inclined grate disposed within and running the length of said preheater stage;
   means for supplying glass batch material to said preheater stage near the high end of said inclined grate to form a shallow bed upon said grate;

means for supplying exhaust gases from said regenerator to said plenum chamber for flow upwardly through said grate to fluidize and heat said glass batch material;
a plenum chamber disposed beneath said grate;
a steam compartment disposed in said plenum chamber and having an open end adjacent to said grate;
means for supplying steam to said steam compartment for flow upwardly through said grate to moisten and aid in fluidization of said glass batch material; and
outlet means for removing glass batch material from said preheater stage.

6. A glass batch preheater as defined in claim 2 further including a partition extending downwardly from said grate to divide said plenum chamber into two sections and a supplementary burner disposed within said plenum chamber in one of said sections to provide additional heat to said glass batch material.

7. A glass batch preheater as defined in claim 2 further including a weir extending upwardly from said grate adjacent said outlet means of said preheater stage, the height of said bed being controlled by said weir, batch material reaching said outlet means upon overflowing said weir.

* * * * *